US011977607B2

(12) United States Patent
Byun et al.

(10) Patent No.: US 11,977,607 B2
(45) Date of Patent: May 7, 2024

(54) CAM-BASED WEAKLY SUPERVISED LEARNING OBJECT LOCALIZATION DEVICE AND METHOD

(71) Applicant: UIF (University Industry Foundation), Yonsei University, Seoul (KR)

(72) Inventors: Hye Ran Byun, Seoul (KR); Sanghuk Lee, Seoul (KR); Cheolhyun Mun, Seoul (KR); Pilhyeon Lee, Seoul (KR); Jewook Lee, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 392 days.

(21) Appl. No.: 17/520,077

(22) Filed: Nov. 5, 2021

(65) Prior Publication Data
US 2023/0093503 A1    Mar. 23, 2023

(30) Foreign Application Priority Data

Sep. 23, 2021    (KR) .......................... 10-2021-0125952

(51) Int. Cl.
| | |
|---|---|
| *G06F 18/24* | (2023.01) |
| *G06F 18/213* | (2023.01) |
| *G06N 3/08* | (2023.01) |
| *G06T 7/73* | (2017.01) |
| *G06V 10/28* | (2022.01) |

(52) U.S. Cl.
CPC ............ *G06F 18/24* (2023.01); *G06F 18/213* (2023.01); *G06N 3/08* (2013.01); *G06T 7/73* (2017.01); *G06V 10/28* (2022.01); *G06T 2207/20081* (2013.01); *G06T 2207/20084* (2013.01)

(58) Field of Classification Search
CPC ......... G06F 18/24; G06F 18/213; G06N 3/08; G06N 3/0464; G06N 3/048; G06N 3/09; G06T 7/73; G06T 2207/20081; G06T 2207/20084; G06T 7/11; G06V 10/28;
(Continued)

(56) References Cited

FOREIGN PATENT DOCUMENTS

KR    10-2051032 B1    12/2019

OTHER PUBLICATIONS

Jiang et al. "LayerCAM: Exploring Hierarchical Class Activation Maps for Localization", IEEE Transactions On Image Processing, vol. 30, 2021 (Year: 2021).*

* cited by examiner

*Primary Examiner* — Chan S Park
*Assistant Examiner* — Daniel C Chang
(74) *Attorney, Agent, or Firm* — Paratus Law Group, PLLC

(57) ABSTRACT

Disclosed are a CAM-based weakly supervised object localization device and method. The device includes: a feature map extractor configured to extract a feature map of a last convolutional layer in a convolutional neural network (CNN) in a process of applying an image to the CNN; a weight vector binarization unit configured to first binarize a weight vector of a linear layer in a process of sequentially applying the feature map to a pooling layer that generates a feature vector and the linear layer that generates a class label; a feature map binarization unit configured to second binarize the feature map based on the first binarized weight vector; and a class activation map generation unit configured to generate a class activation map for object localization based on the second binarized feature map.

13 Claims, 10 Drawing Sheets

(58) Field of Classification Search
CPC .. G06V 10/255; G06V 10/454; G06V 10/764; G06V 10/82
See application file for complete search history.

FIG. 7
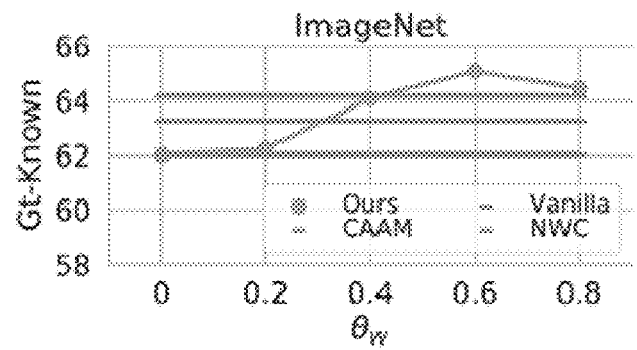
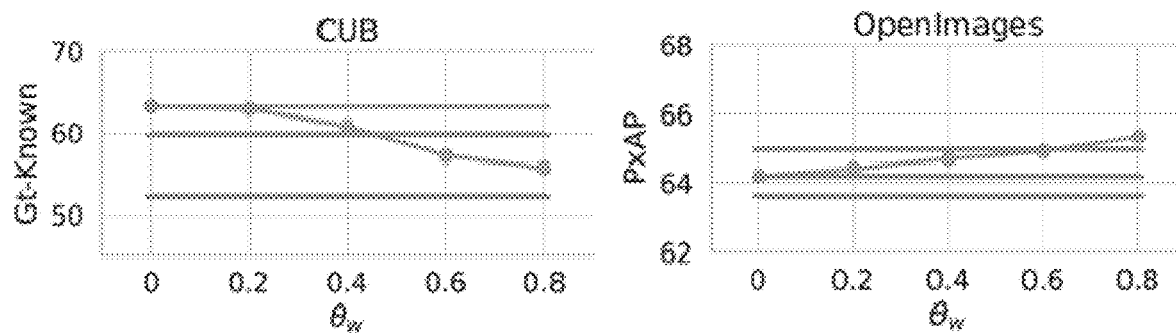
FIG. 8
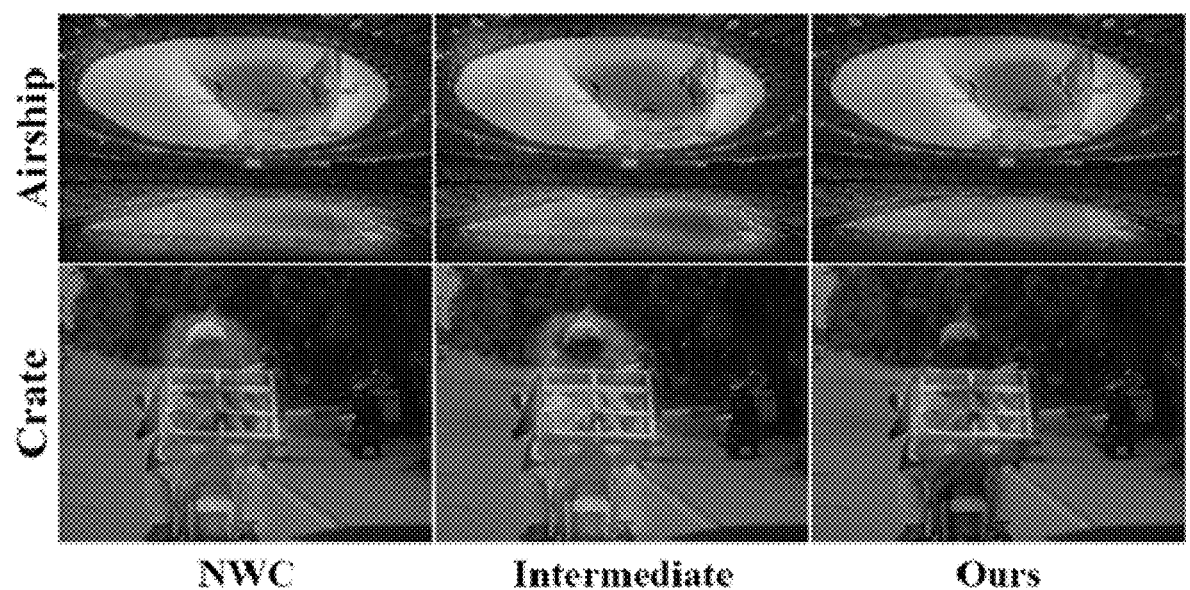

Vanilla CAM | Ours w/o Feature Binarize | Ours w/ Feature Binarize $F_l$ $\quad$ $F_m$ $\quad$ $F_n$

FIG. 11

Table 1. Maximal Box Accuracy(MaxBoxAcc) and Pixel Average Precision(PxAP) results.

FIG. 12

| Backbone | Method | ImageNet | | CUB | |
|---|---|---|---|---|---|
| | | Top1 Loc | GT Loc | Top1 Loc | GT Loc |
| VGG16 | CAM | 42.04 | 58.43 | 39.59 | 73.14 |
| | CAM+ours | 45.61 | 64.85 | 43.03 | 83.29 |
| Inception | CAM | 49.84 | 65.77 | 44.30 | 61.01 |
| | CAM+ours | 51.14 | 68.16 | 52.47 | 75.13 |
| ResNet | CAM | 51.56 | 64.59 | 56.63 | 74.13 |
| | CAM+ours | 53.67 | 67.90 | 64.70 | 86.81 |

Table 2. Top1 localization and GT-known localization results of our method on vanilla CAM.

FIG. 13

| Backbone | Method | Top1 Loc | GT Loc | Top1 Cls |
|---|---|---|---|---|
| VGG16 | EIL[†] | 45.47 | 60.87 | 69.20 |
| | EIL+ours | 46.24 | 62.20 | 69.20 |
| | R-CAM[†] | 43.21 | 60.36 | 66.51 |
| | R-CAM+ours | 43.38 | 60.59 | 66.51 |
| ResNet | R-CAM | 52.89 | 66.15 | 75.93 |
| | R-CAM+ours | 54.00 | 67.38 | 75.93 |

Table 3. ImageNet : Top1 and GT-known localization results of our method on recent methods.

FIG. 14

| Backbone | Method | Top1 Loc | GT Loc | Top1 Cls |
|---|---|---|---|---|
| VGG16 | EIL[†] | 55.25 | 70.95 | 73.20 |
| VGG16 | EIL+ours | 57.28 | 76.27 | 73.20 |
| VGG16 | R-CAM[†] | 60.86 | 80.76 | 74.28 |
| VGG16 | R-CAM+ours | 62.69 | 83.05 | 74.28 |
| ResNet | R-CAM[†] | 60.30 | 74.97 | 79.08 |
| ResNet | R-CAM+ours | 65.72 | 81.46 | 79.08 |

Table 4. CUB : Top1 and GT-known localization results of our method on recent methods.

FIG. 15

| Methods | BW | SF | BF | ImageNet | | | | CUB | | | |
|---|---|---|---|---|---|---|---|---|---|---|---|
| | | | | IoU30 | IoU50 | IoU70 | Mean | IoU30 | IoU50 | IoU70 | Mean |
| CAM | ✗ | ✗ | ✗ | 83.73 | 65.58 | 41.61 | 63.64 | 95.96 | 74.15 | 20.75 | 63.62 |
| CAM | ✓ | ✗ | ✗ | 81.41 | 63.07 | 40.49 | 61.66 | 99.28 | 86.38 | 33.10 | 72.92 |
| CAM | ✓ | ✓ | ✗ | 84.22 | 67.05 | 44.00 | 65.09 | 99.28 | 86.38 | 33.10 | 72.92 |
| CAM | ✓ | ✓ | ✓ | 85.75 | 68.87 | 45.62 | 66.75 | 99.37 | 87.16 | 33.74 | 73.43 |

FIG. 16
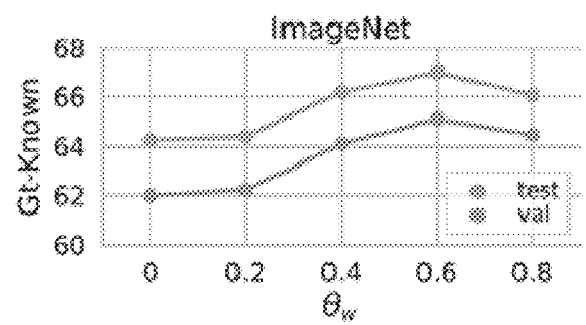
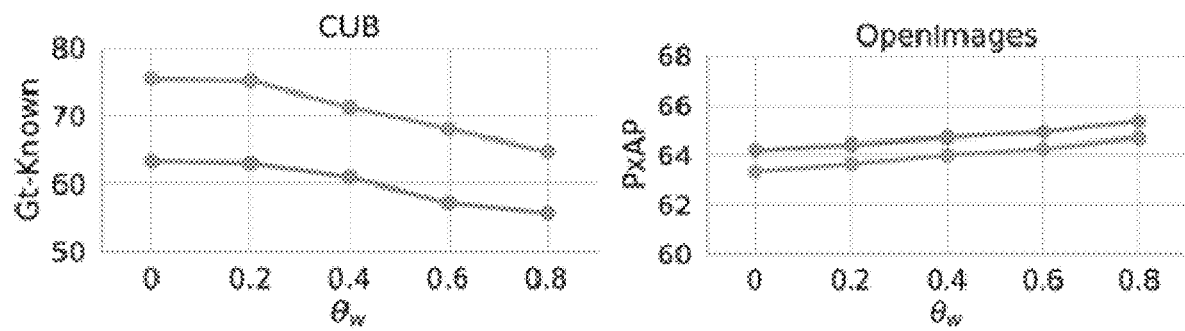

CAM-BASED WEAKLY SUPERVISED LEARNING OBJECT LOCALIZATION DEVICE AND METHOD

ACKNOWLEDGEMENT

The present patent application has been filed as a research project as described below.

[National Research Development Project supporting the Present Invention]
[Project Serial No.] 1711126082
[Project No.] 2020-0-01361-002
[Department] Ministry of Science and ICT
[Project management (Professional) Institute] Institute of Information & Communication Technology Planning & Evaluation
[Research Project Name] Information & Communication Broadcasting Research Development Project
[Research Task Name] Artificial Intelligence Graduate School Support (Yonsei University)
[Contribution Ratio] 1/2
[Project Performing Institute] Yonsei University Industry Foundation
[Research Period] 2021.01.01~2021.12.31
[National Research Development Project supporting the Present Invention]
[Project Serial No.] 1711134177
[Project No.] 2019R1A22C2003760
[Department] Ministry of Science and ICT
[Project management (Professional) Institute] National Research Foundation of Korea
[Research Project Name] Mid-level Researcher Support Project
[Research Task Name] A Study on Zero-shot Learning Technology for Creating and Recognizing Images and Videos of Complex Categories You See for the First Time Through Automatic Generation of Characteristic Information
[Contribution Ratio] 1/2
[Project Performing Institute] Yonsei University
[Research Period] 2021.03.01~2022.02.28

CROSS-REFERENCE TO PRIOR APPLICATION

This application claims priority to Korean Patent Application No. 10-2021-0125952 (filed on Sep. 23, 2021), which is hereby incorporated by reference in its entirety.

BACKGROUND

The present disclosure relates to a CAM generation technology, and more particularly, to a CAM-based weak supervised object localization device and method capable of generating a CAM with low reliance on classification tasks to outline performance of weak supervised object localization.

A goal of object localization may be to capture a location of a target object in a scene. Over the past decade, deep learning approaches have made impressive improvements in a variety of computer vision tasks, including object localization. Such technologies may rely on fully supervised learning, which requires expensive annotations for localization such as bounding boxes. On the other hand, weakly supervised object localization (WSOL) may process the same tasks with weak maps such as image-level class labels. The economical efficiency has received a lot of attention in recent years.

Recent studies of weakly supervised object localization have mainly focused on a method of generating a bounding box based on a class activation map of an image by inputting the image into a classification network. Here, the class activation map may correspond to a method of intuitively visualizing a determination of a class of an image by looking at which region of an image by using a heat map when a network determines the class of the image.

The existing CAM generation method may be performed by a method of multiplying and adding the last layer feature map of a classification network and a weight of a classifier for each channel. Accordingly, the classification networks tend to focus on small singular regions of objects in order to classify images well, and this feature may form a contradictory relationship with an object localization mission to localize the entire object.

RELATED ART DOCUMENT

Patent Document (Patent Document 0001) Korean Patent No. 10-2051032 (Nov. 26, 2019)

SUMMARY

The present disclosure provides improving object localization performance of weakly supervised learning by capturing even a region of an object, which the existing CAM may not capture, through CAM development based on binarization without additional learning.

The present disclosure provides a CAM-based weakly supervised learning object localization device and method capable of selectively utilizing a feature map to help generate CAM by binarizing a weight value of a classifier.

In an aspect, a CAM-based weakly supervised object localization (WOSL) device includes: a feature map extractor configured to extract a feature map of a last convolutional layer in a convolutional neural network (CNN) in a process of applying an image to the CNN; a weight vector binarization unit configured to first binarize a weight vector of a linear layer in a process of sequentially applying the feature map to a pooling layer that generates a feature vector and the linear layer that generates a class label; a feature map binarization unit configured to second binarize the feature map based on the first binarized weight vector; and a class activation map generation unit configured to generate a class activation map for object localization based on the second binarized feature map.

The pooling layer may be implemented to generate the feature vector by performing global average pooling on the feature map.

The weight vector binarization unit may perform the first binarization on the weight vector based on a threshold.

The weight vector binarization unit may perform a grid search based on a plurality of relative thresholds in order to optimize the threshold.

The weight vector binarization unit may perform the grid search using Equation 1 below.

$$\tau_{w_c} = \min(w_c) + \{\max(w_c) - \min(w_c)\} * \theta_w \quad \text{[Equation 1]}$$

Here, $\tau_{w_c}$ denotes an optimal threshold for a weight of a c-th target class, $c \in C$ (where C is the number of target classes), $w \in W$ (where W is the weight vector), and $\theta w$ denotes the relative threshold.

The feature map binarization unit may apply the first binarized weight vector to the feature map to select at least one of the channels of the feature map.

The feature map binarization unit may perform the second binarization on the at least one of some channels based on a feature binarize threshold.

The feature map binarization unit may perform the second binarization using Equation 2 below.

$$F_k = 1(F_k(x,y) > T_f)$$ [Equation 2]

Here, $F_k(x,y)$ denotes an element of a k-th channel of a feature map $F_k$ for a y-th row and an x-th column, and $T_f$ denotes a feature binarize threshold.

The class activation map generation unit may generate the class activation map by aggregating the at least one of second binarized some channels.

In another aspect, a CAM-based weakly supervised object localization (WOSL) method includes: extracting a feature map of a last convolutional layer in a convolutional neural network (CNN) in a process of applying an image to the CNN; first binarizing a weight vector of a linear layer in a process of sequentially applying the feature map to a pooling layer that generates a feature vector and the linear layer that generates a class label; second binarizing the feature map based on the first binarized weight vector; and generating a class activation map for object localization based on the second binarized feature map.

The first binarizing may include performing the first binarization on the weight vector based on a threshold.

The second binarizing may include selecting at least one of some channels among channels of the feature map by applying the first binarized weight vector to the feature map.

The second binarizing may include performing the second binarization on the at least one of some channels based on a feature binarize threshold.

The disclosed technology may have the following effects. However, since a specific embodiment is not construed as including all of the following effects or only the following effects, it should not be understood that the scope of the disclosed technology is limited to the specific embodiment.

Currently, most weakly supervised object localization methods is to solve a CAM partialization problem in a method of erasing a part of an image during a learning process or adjusting a feature distribution of the same class.

However, since the method is a method of changing a network structure, there may be a problem in that additional training is required and more computing resources are required.

However, the method according to the present disclosure intends to transform and use the already acquired information into be suitable for object localization without additional training, and requires additional learning and has an advantage in that no additional learning or computing power is required as the method is a method that may be directly applied to a model of the existing network.

BRIEF DESCRIPTION OF THE DRAWINGS

FIG. 7 is a diagram for describing a hyperparameter sweep with respect to a relative threshold.

FIG. 8 is a diagram for describing failure cases of NWC and the present disclosure.

FIGS. 11 to 16 are diagrams illustrating experimental results related to the present disclosure.

DETAILED DESCRIPTION

Figure 1:
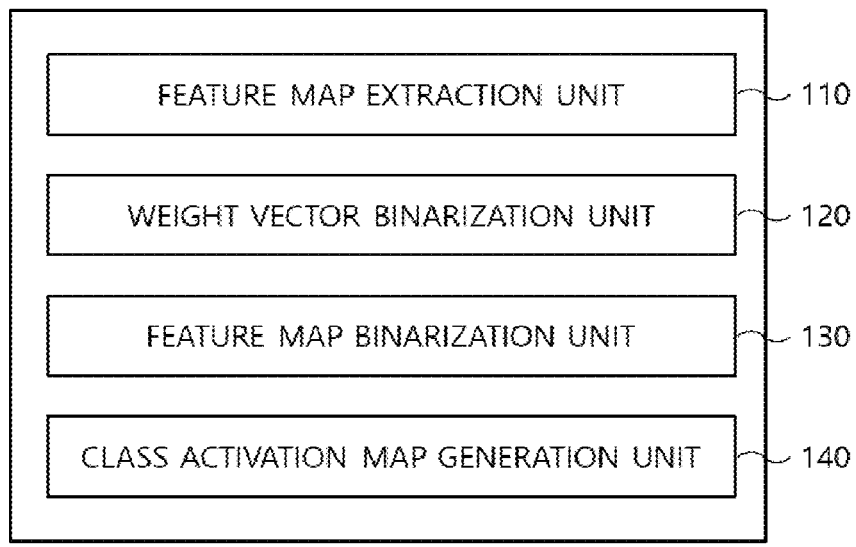
FIG. 1 is a diagram illustrating a functional configuration of a weakly supervised object localization device according to the present disclosure.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between", "directly between", "neighboring to", "directly neighboring to" and the like, should be similarly interpreted.

It should be understood that the singular expression include the plural expression unless the context clearly indicates otherwise, and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

In each step, an identification code (for example, a, b, c, and the like) is used for convenience of description, and the identification code does not describe the order of each step, and each step may be different from the specified order unless the context clearly indicates a particular order. That is, the respective steps may be performed in the same sequence as the described sequence, be performed at substantially the same time, or be performed in an opposite sequence to the described sequence.

The present disclosure may be embodied as computer readable code on a computer readable recording medium, and the computer readable recording medium includes all types of recording devices in which data may be read by a computer system. An example of the computer readable recording medium may include a read only memory (ROM), a random access memory (RAM), a compact disk read only memory (CD-ROM), a magnetic tape, a floppy disk, an optical data storage, or the like. In addition, the computer readable recording medium may be distributed in computer systems connected to each other through a network, such that the computer readable codes may be stored in a distributed scheme and executed.

Unless defined otherwise, all the terms used herein including technical and scientific terms have the same meaning as meanings generally understood by those skilled in the art to which the present disclosure pertains. It should be understood that the terms defined by the dictionary are identical with the meanings within the context of the related art, and they should not be ideally or excessively formally defined unless the context clearly dictates otherwise.

Class activation mapping (CAM) may be the most widely used method to solve weakly supervised object localization (WSOL) problems. The CAM may train a convolutional neural network to predict image-level class labels. In an inference step, the CAM may extract an attention map by applying weighted average pooling to a channel dimension of the last convolutional feature map. In the case of the weighted average pooling, a weight vector of the last fully connected layer may be used. This may be a reasonable approach because the CNN operates as an object detector and weight vectors aggregate responses. Accordingly, the result attention map may highlight and display a location of a target object.

However, a classifier (classifier) trains only information necessary for a unique task, and therefore, may not necessarily match a range of the target object. For example, in order to distinguish a yellow-headed blackbird from other blackbirds, hair color only may be required. Accordingly, the classifier may have a tendency to detect the most distinct part of an object or background object that frequently appears with the target object. To alleviate this limitation, the most existing WSOL technologies have introduced a special learning process that induces the classifier to be activated over the entire range of the object.

In addition to these specialized learning technologies, recently PsyNet and R-CAM raise a question about the weighted average in the inference step. The PsyNet introduced class-agnostic activation mapping (CAAM), which does not use a weight vector of a fully connected layer, and averages the last convolutional feature map in a channel dimension instead. That is, each channel may equally contribute to the attention map. As a result, better localization performance appears, and thus, it shows that not using weight vectors may be better. However, the CAAM may not generalize to other data sets.

On the other hand, R-CAM proposes negative weight clamping to make a negative value of the weight vector for the CAM equal to zero. The R-CAM may make the attention map highlight only the object region, and shows that it is better to use a subset of the channels in the feature map. However, the negative weight clamping may not always give the best performance. What is important is that a distribution of informative channels may vary depending on backbone choices and datasets.

FIG. 1 is a diagram for describing a functional configuration of a weakly supervised object localization device according to the present disclosure.

Referring to FIG. 1, a weakly supervised object localization device 100 may be implemented to include a plurality of functional components for executing a CAM-based weakly supervised object localization method according to the present disclosure. That is, the weakly supervised object localization device 100 may include a feature map extraction unit 110, a weight vector binarization unit 120, a feature map binarization unit 130, a class activation map generation unit 140, and a control unit (not illustrated in FIG. 1).

The feature map extraction unit 110 may extract the feature map of the last convolutional layer in a convolutional neural network (CNN) in the process of applying the image to the CNN. In this case, the CNN may correspond to a previously built CNN model. The feature map extraction unit 110 may read an image stored in a database and then provide the read image as an input of the CNN, and may perform a predetermined pre-processing operation on the image if necessary. For example, the feature map extraction unit 110 may cut an image to have a predetermined size, adjust resolution, and apply predetermined filters. The feature map extraction unit 110 may extract feature maps generated in the last convolutional layer of the CNN, and then, transmit the extracted feature maps for the next operation step.

The weight vector binarization unit 120 may first binarize the weight vector of the linear layer in the process of sequentially applying the feature maps to the pooling layer and the linear layer. That is, the feature maps generated by passing the CNN may be used in the process of performing a classification operation on the image used as the input of the CNN by sequentially passing the pooling layer and the linear layer. Here, the pooling layer may correspond to a network layer that receives a feature map as an input and generates a feature vector as an output, and may perform a pooling operation on the feature map. In an embodiment, the pooling layer may be implemented to generate a feature vector by performing global average pooling on the feature map.

In addition, the linear layer may correspond to a network layer that receives the feature vector generated through the pooling layer as an input and generates a class label of an object identified on an image as an output. The linear layer may be previously built as a result of repeatedly performing an operation of adjusting the weight vector. Meanwhile, the CNN, the pooling layer, and the linear layer may be built through pre-training in a state of being interconnected, and the whole may form a single classification network. The weight vector binarized by the weight vector binarization unit 120 may be utilized in a process of selecting the feature maps in subsequent steps.

In an embodiment, the weight vector binarization unit 120 may perform first binarization on the weight vector based on a threshold. Here, the first binarization may correspond to an operation of binarizing the weight vector of the linear layer. To this end, the weight vector binarization unit 120 may use a preset predetermined threshold. That is, the weight vector binarization unit 120 may change the value of the weight vector to 0 or 1 according to a comparison result between the threshold and the weight vector.

In an embodiment, the weight vector binarization unit 120 may perform a grid search based on a plurality of relative thresholds in order to optimize the threshold. The weight vector binarization unit 120 may perform the grid search to find an optimal threshold for weight binarization. Here, the grid search may correspond to a method in which the values to be searched are defined in advance as a set of hyperparameters, and model results are calculated for all combinations to find the optimal combination. That is, the weight vector binarization unit 120 may define a plurality of relative thresholds for the grid search. For example, the plurality of relative thresholds may be defined as a set of 0, 0.2, 0.4, 0.6, and 0.8, and the weight vector binarization unit 120 may determine a threshold, which derives the best result through grid search, as the optimal threshold.

In an embodiment, the weight vector binarization unit 120 may perform the grid search using Equation 1 below.

$$\tau_{wc} = \min(w_c) + \{\max(w_c) - \min(w_c)\} * \theta_w \quad \text{[Equation 1]}$$

Here, $\tau_{wc}$ denotes an optimal threshold for a weight of a c-th target class, $c \in C$ (where C is the number of target classes), $w \in W$ (where W is the weight vector), and $\theta w$ denotes the relative threshold. That is, the weight vector binarization unit 120 may determine an optimal threshold for weight binarization for each target class for classification using Equation 1 above.

The feature map binarization unit 130 may second binarize the feature map based on the first binarized weight vector. Here, the second binarization may correspond to an operation of binarizing the feature maps extracted from the last convolutional layer. To this end, the feature map binarization unit 130 may use a preset predetermined threshold. That is, the feature map binarization unit 130 may change each pixel value of the feature map to 0 or 1 according to the comparison result between the threshold and the features. Meanwhile, the first binarized weight vector may be used in the process of selecting feature maps to be used in the second binarization process from among the feature maps extracted from the last convolutional layer.

In an embodiment, the feature map binarization unit 130 may select at least one of some channels among channels of the feature map by applying the first binarized weight vector to the feature map. The first binarized weight vector may have a binarized vector value for each target class and channel, and the feature map binarization unit 130 may select feature maps corresponding to a binarized vector value of 1 and perform a second binarization operation on the feature maps.

In an embodiment, the feature map binarization unit 130 may perform the second binarization on at least one of some channels based on the feature binarize threshold. The feature map binarization unit 130 may perform the binarization operation on the feature map of some selected channels to remove imbalanced pixel values in the channel, and as a result, each channel is equally aggregated in a subsequent operation step. That is, the feature binarize threshold may correspond to a threshold used to perform the binarization operation on the feature map, and as a result, it may be derived whether each region of the feature map is activated or not.

In an embodiment, the feature map binarization unit 130 may perform the second binarization using Equation 2 below.

$$F_k = 1(F_k(x,y) > T_f) \quad \text{[Equation 2]}$$

Here, $F_k(x,y)$ denotes an element of a k-th channel of a feature map $F_k$ for a y-th row and an x-th column, and $T_f$ denotes a feature binarize threshold. That is, the feature map binarization unit 130 may change the corresponding pixel value to 1 when a pixel value of a specific channel is greater than the feature binarize threshold, and otherwise, may change the corresponding pixel value to 0.

The class activation map generation unit 140 may generate the class activation map for object localization based on the second binarized feature map. The class activation map generation unit 140 may generate the class activation map based on the binarized feature map so that the activated region in the channel contributes uniformly to the class activation map.

In an embodiment, the class activation map generation unit 140 may generate the class activation map by aggregating at least second binarized some channels. The class activation map generation unit 140 may generate the class activation map by aggregating channels for the binarized feature map. Accordingly, unlike the existing method in which individual pixel values in the channel affect the final result, how often the activated region appears in the whole may influence the result of the class activation map.

The control unit (not illustrated in FIG. 1) may control the overall operation of the weakly supervised object localization device 100, and manage a control flow or a data flow between the feature map extraction unit 110, the weight vector binarization unit 120, the feature map binarization unit 130, and the class activation map generation unit 140.

Figure 2:
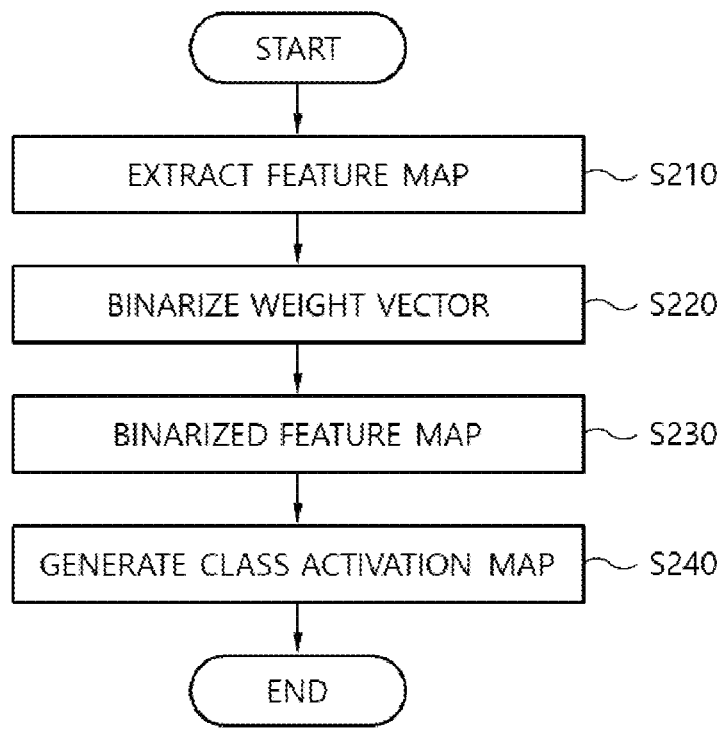
FIG. 2 is a flowchart illustrating an embodiment of a CAM-based weakly supervised object localization method according to the present disclosure.

FIG. 2 is a flowchart illustrating an embodiment of a CAM-based weakly supervised object localization method according to the present disclosure.

Referring to FIG. 2, the weakly supervised object localization device 100 may extract the feature map of the last convolutional layer in the CNN in the process of applying the image to the CNN through the feature map extraction unit 110 (step S210).

The weakly supervised object localization device 100 may first binarized the weight vector in the process of sequentially applying the feature map to the pooling layer that generates the feature vector and the linear layer that generates the class label through the weight vector binarization unit 120 (step S220).

The weakly supervised object localization device 100 may second binarize the feature map based on the first binarized weight vector through the feature map binarization unit 130 (step S230). In addition, the weakly supervised object localization device 100 may generate the class activation map for object localization based on the second binarized feature map through the class activation map generation unit 140 (step S240).

Hereinafter, a CAM-based weakly supervised object localization method according to the present disclosure will be described in more detail with reference to FIGS. 3 to 16.

Figure 3:
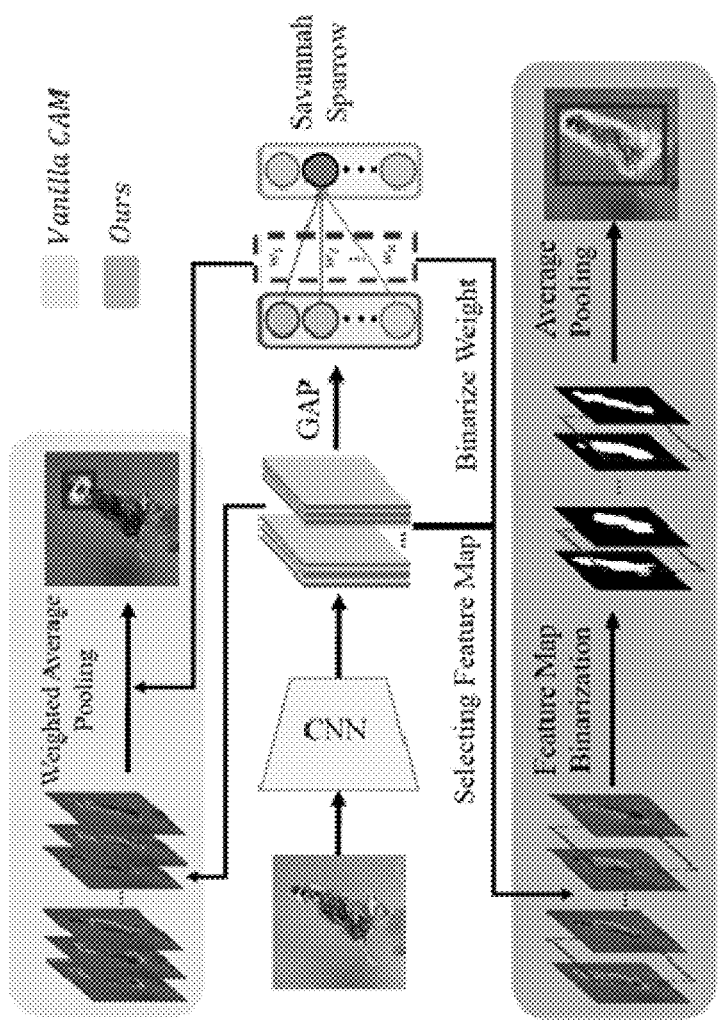
FIG. 3 is an overall conceptual diagram of the CAM-based weakly supervised object localization method according to the present disclosure.

The CAM-based weakly supervised object localization method according to the present disclosure is schematically illustrated in FIG. 3, and the process for generating a class activation map may be different compared to the basic CAM. The CAM-based weakly supervised object localization method according to the present disclosure enables a model to capture the entire range of a target object by selecting and applying a feature map having weight binarization and feature map binarization.

The CAM-based weakly supervised object localization method according to the present disclosure may select a channel with a weight higher than a flexible threshold and process the selected channels as having the same importance. In contrast, negative weight clamping (NWC) may use a fixed threshold (0) without changing a positive weight, and class-agnostic activation mapping (CAAM) may be used by changing all weights to 1 without channel selection.

In particular, the CAAM may be considered as a special case of the weight binarization when the threshold is set to a minimum value of the weight vector.

In addition, the CAM-based weakly supervised object localization method according to the present disclosure may binarize activation within each channel using the flexible threshold. In practice, such a method may be effective for the attention map to detect the entire range of an object.

The CAM-based weakly supervised object localization method according to the present disclosure may improve the existing WSOL methods according to various backbone selections and data sets. The CAM-based weakly supervised object localization method according to the present disclosure may be used more easily in that additional training is not required.

On the other hand, the CAM may be the most used method of extracting the attention map, and a method of generating a class activation map using a gradient is also introduced. For example, Grad-CAM may use gradient information instead of using a weight of the fully connected layer when generating an activation map. The Grad-CAM may further generalize the network to extract the activation maps from all convolutional layers. Also, the Grad-CAM may free the activation map from the global average pooling layer. However, the Grad-CAM has a disadvantage in that it may not detect multiple objects in an image. To solve this problem, Grad-CAM++ may use the weighted average of the gradients for each pixel to measure the importance of each pixel of the feature maps in the course of the network.

In addition, DGL proposes a gradient-based method, but may not sum the gradients of each channel to maintain spatial information. In addition to these technologies, the CCAM, the PsyNet, and the R-CAM may also correspond to methods of extracting a feature map in an inference step. The CCAM found that a class activation map with a low probability class focuses on a background region, whereas a class activation map with a high probability class captures a foreground well. Therefore, the CCAM may combine different class activation maps from the highest probability class label to the lowest probability class label to obtain a better activation map.

In addition, the PsyNet proposed the class-agnostic activation mapping (CAAM) to extract the activation map by averaging the last convolutional feature map directly at the channel level. The CAAM may also be used for unsupervised object localization as it does not require image-level labels to obtain weights. The R-CAM observed the distribution of the activated region in the feature map when only a positive or negative weight is used, and found that the two distributions are very similar. The R-CAM may fix the negative weight to 0 to obtain a better attention map based on this analysis.

Figure 4:
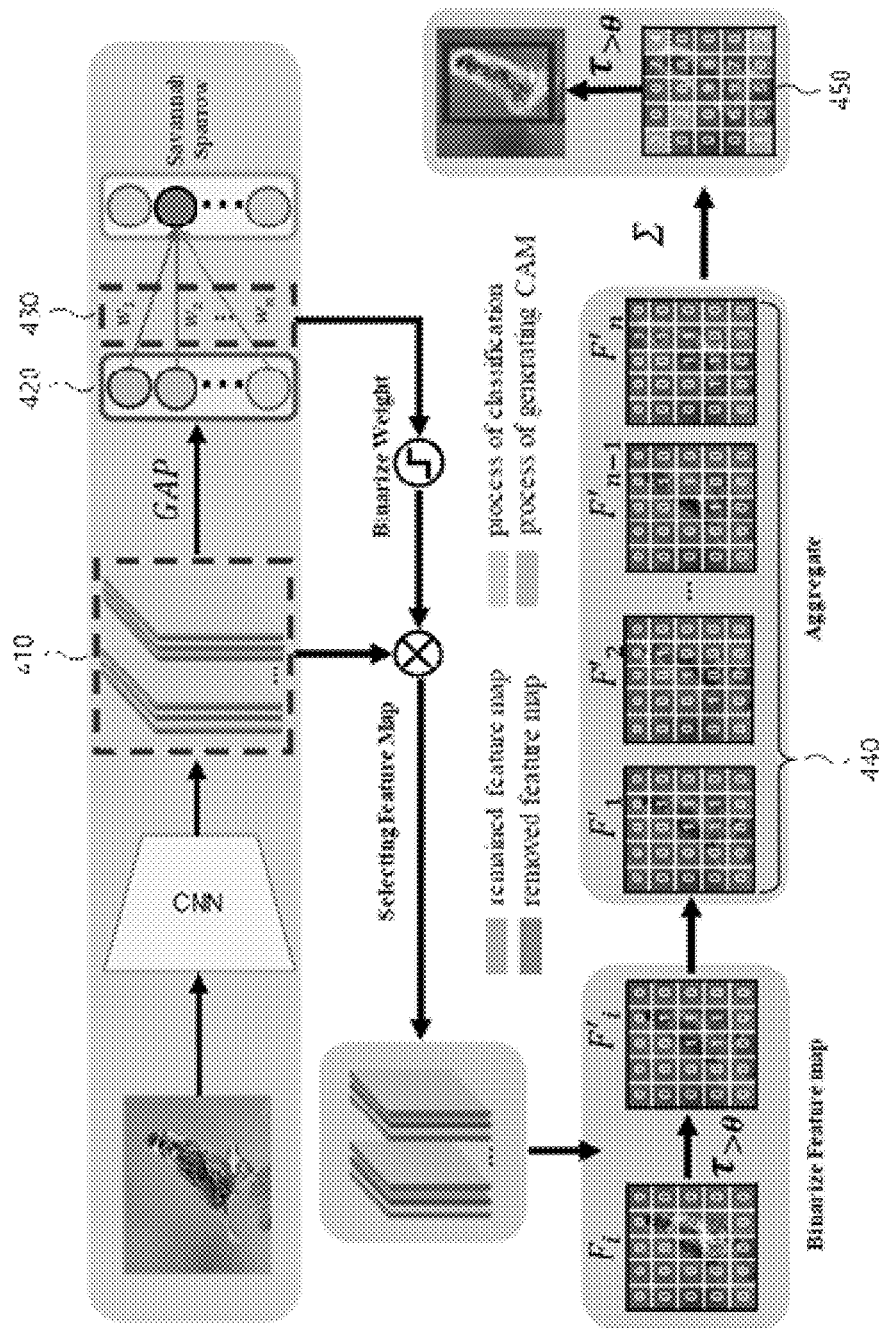
FIG. 4 is an entire structure of the CAM-based weakly supervised object localization method according to the present disclosure.

In FIG. 4, the class activation mapping (CAM) may correspond to a technology for generating a localization map. The CAM may perform the global average pooling on a feature map of a last convolutional layer 410 and pools for a linear layer that generates a class label, and a pooled feature vector 420 generated through pooling for a linear layer that generates a class label. Thereafter, an activation map 450 may be calculated as a weighted sum of the channels 440 of the feature map using the weight 430 of the linear layer for the target class. Recent class-agnostic activation mapping (CAAM) averages all channels without weights, and the negative weight clamping (NWC) may set a negative weight to zero.

Figure 5:
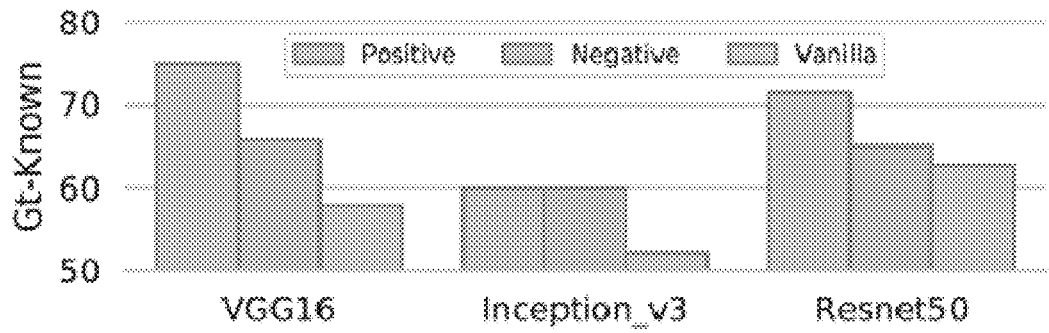
FIG. 5 is a diagram for describing a result of comparing detection performance for CUB.

In FIG. 5, the results of comparing the performance of (1) CAM (positive) with only the positive weight, (2) CAM (negative) with negative but an absolute weight, and (3) Vanilla CAM (Vanilla) on the CUB data set are shown. The result (negative) of using the negative weight channel may appear higher than that of the Vanilla which uses both the positive and negative weights. It may indicate that a channel with a negative weight still covers the foreground region. The negative channel may mean a different class, but still may be assumed to be a bird in CUB, which may match the effect of CAAM on the CUB. On the other hand, the CAAM may suffer from ImageNet including various classes, and the NWC may have an advantage of discarding negative weights.

Figure 6:
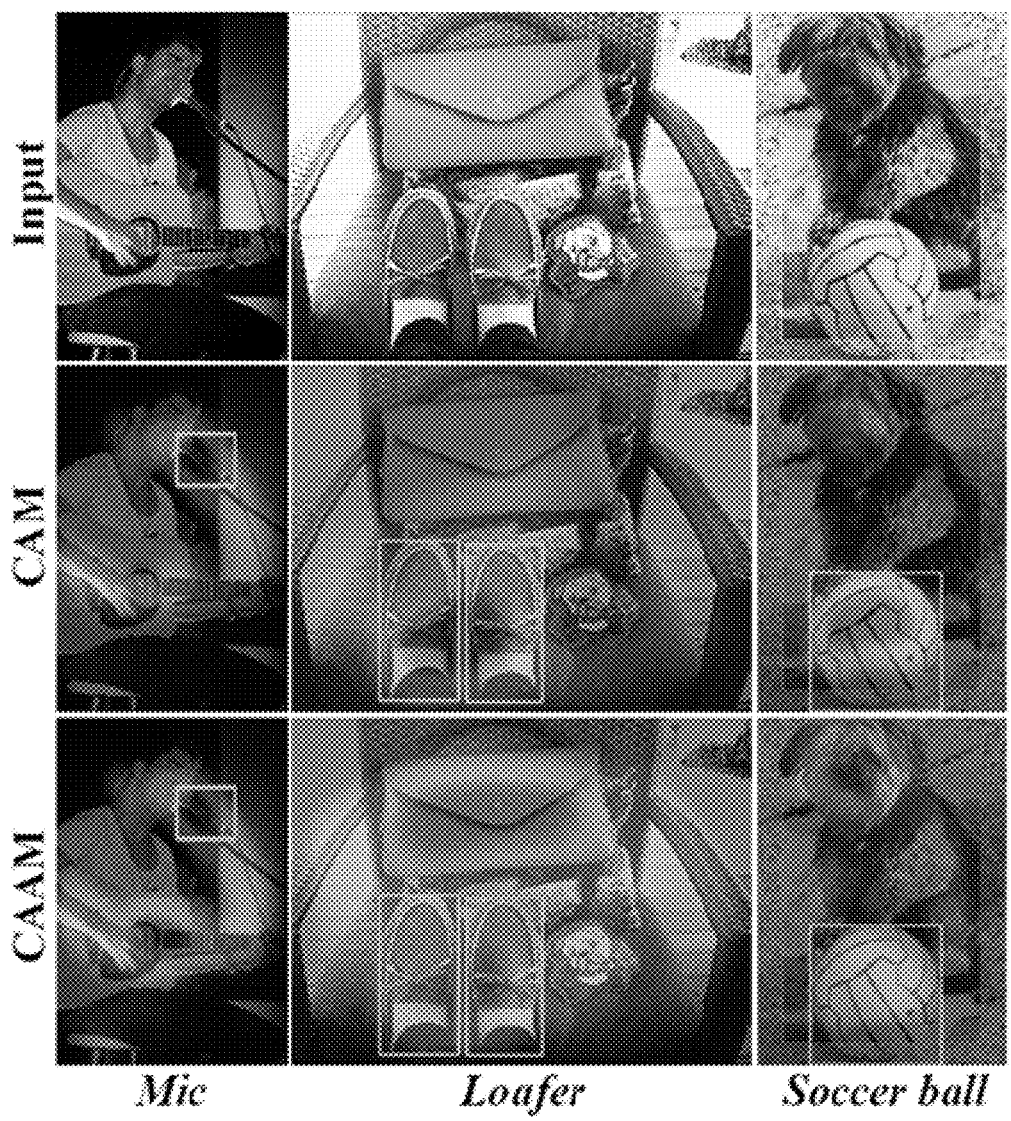
FIG. 6 is a diagram illustrating failure cases of CAM and CAAM for ImageNet.

FIG. 6 illustrates an example of generating a false positive in classes (e.g., shoes and bags, balls and dogs) in which the CAM and CAAM occur simultaneously.

The CAM-based weakly supervised object localization method according to the present disclosure may binarize the weight with the flexible threshold. That is, the present disclosure may select channels with a weight higher than the threshold and aggregate the selected channels evenly. To this end, it may be assumed that a threshold (corresponding to false positives in detection) greater than zero eliminates positives in classification. The higher the weight value of the weight vector, the higher the probability that it is a class-related feature map. When it is classified as a useful feature map, the same value may be given to all feature maps in that all classified feature maps should have the same importance.

The present disclosure may formally binarize a weight vector W based on a threshold $\tau_w$, and may be expressed as Equation 0 below.

$$w_{c,k} = \begin{cases} 1, & \text{if } w_{c,k} > \tau_{w_c} \\ 0, & \text{otherwise} \end{cases}, c \in C, k \in K \qquad \text{[Equation 0]}$$

Here, C is the number of target classes, and K is the number of channels in the last convolutional layer. The grid search may be performed on a validation set to find the optimal threshold $\tau_w$. In this case, the search may be performed for five relative thresholds $\theta_w \in \{0, 0.2, 0.4, 0.6, 0.8\}$, and may be expressed as Equation 1 below.

$$\tau_{w_c} = \min(w_c) + \{\max(w_c) - \min(w_c)\} * \theta_w \qquad \text{[Equation 1]}$$

Here, $\tau_{w_c}$ denotes an optimal threshold for a weight of a c-th target class, $c \in C$ (where C is the number of target classes), $w \in W$ (where W is the weight vector), and $\theta_w$ denotes the relative threshold. On the other hand, when $\theta_w = 0$, the present disclosure may be the same as the CAAM of the PsyNet.

By using the optimal threshold $\tau_w$, the feature map useful for the detection may be selected because the corresponding weight value is higher than the threshold. In the present disclosure, the weight vector binarization and the CAAM performance of the PsyNet can appear the same in the CUB. This is because the CAAM corresponds to the special case of the present disclosure, that is, the case where the optimal $\theta_w = 0$.

In FIG. 7, the results of a hyperparameter sweep for ow are illustrated. Indeed, the present disclosure (corresponding to Ours in FIG. 7) may achieve the best localization performance at the optimal $\theta_w$. In addition, deficiency of the NWC may appear in the CUB. In other words, since channels with negative weights are useful, the lower the threshold, the better the performance. In addition, the present disclosure may perform better than the NWC in the ImageNet and the OpenImages.

In FIG. 8, each column shows the activation maps of each of the NWC, the intermediate between the NWC and the present disclosure (Ours), and the present disclosure (Ours). The second column may correspond to the sum of channels not included in the present disclosure but included in the NWC. That is, this may mean that feature maps corresponding to small values of positive weights still focus on instances of other classes. As a result, the present disclosure may filter the corresponding feature map, but cannot filter the corresponding feature map in the NWC. In addition, in the case of FIG. 7, the Vanilla CAM, the NWC, the CAAM, and the present disclosure are compared with each other, and it may mean that the present disclosure has successfully overcome the limitations of the NWC and the CAAM.

Figure 9:
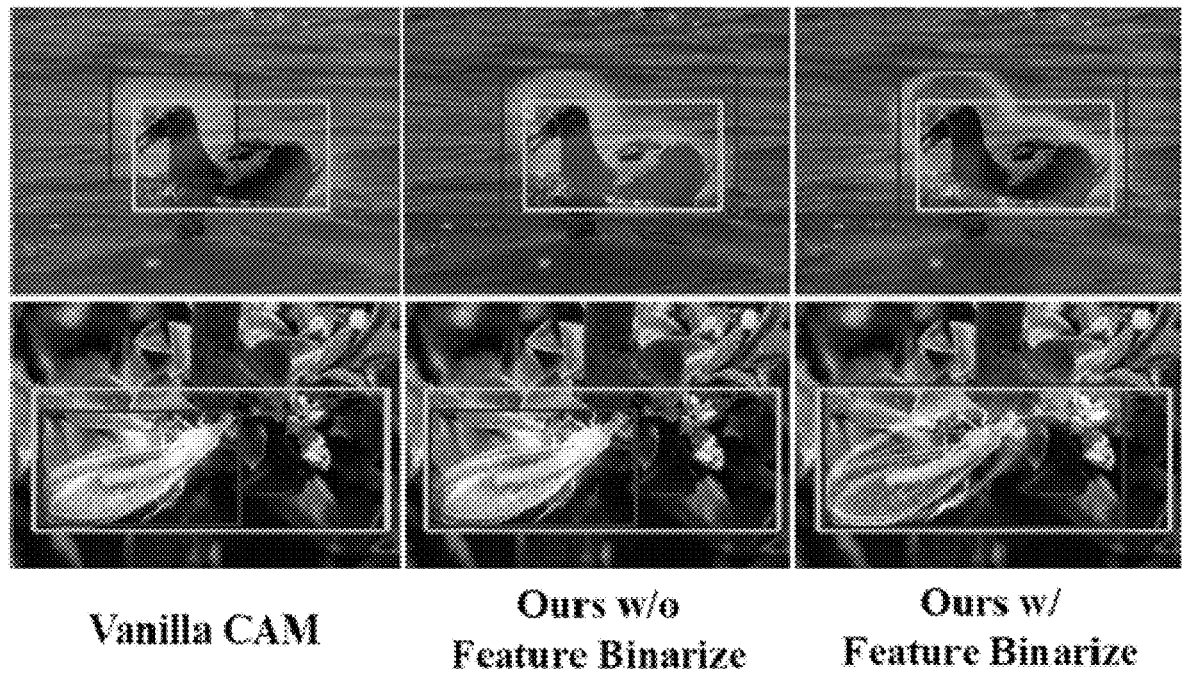
FIG. 9 is a diagram for describing an effect of feature map binarization according to the present disclosure.
Figure 10:
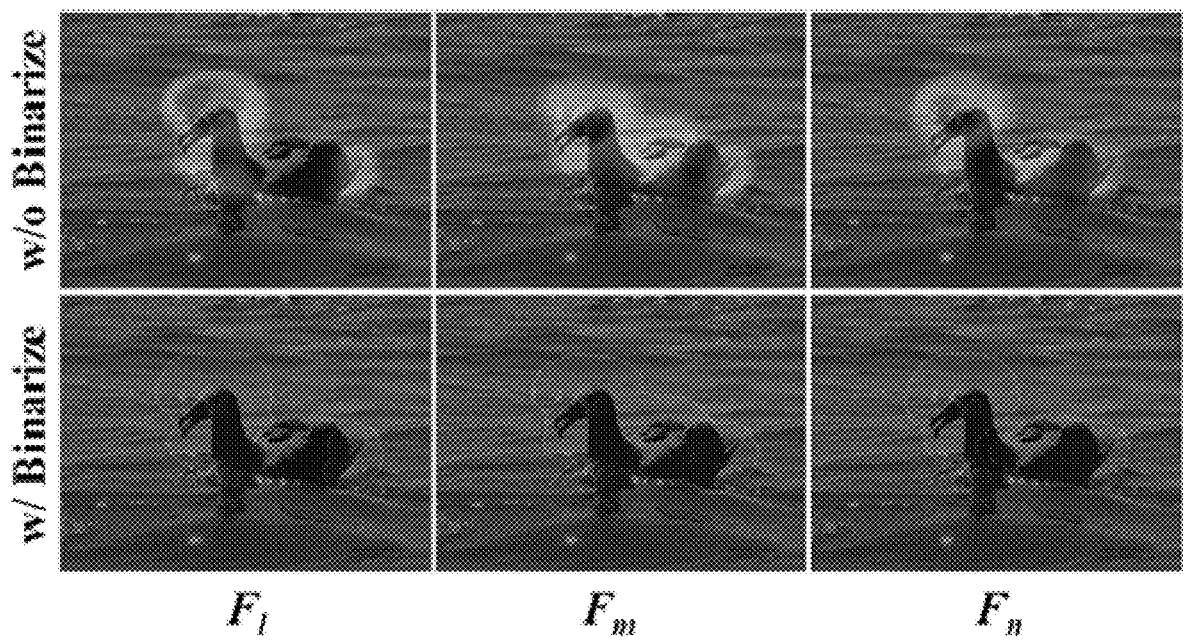
FIG. 10 is a diagram for describing an effect of feature map binarization according to the present disclosure in individual channels.

Referring to FIGS. 9 and 10, in a similar manner, unbalanced pixel values in a channel may be another problem. In the WSOL, a model is trained for a classification task, and thus, may find discriminative parts of an object to be distinguished from other classes. For example, in FIG. 9, a bird's head part may be strongly activated in the case of Vanilla CAM. This is because the model helps classify the bird's head part more easily. As illustrated in the first row of FIG. 10, since the above situation still occurs within the channel, the method of binarizing a weight to aggregate channels evenly may not solve this problem.

To alleviate this problem, the present disclosure may suggest a new method of binarizing activation for each channel. That is, it is possible to determine whether the region is activated by using a feature binarize threshold $\tau_f$. In particular, each channel may be binarized through Equation 2 below.

$$F_k = 1(F_k(x,y) > T_f) \quad \text{[Equation 2]}$$

Here, $F_k(x,y)$ denotes an element of a k-th channel of a feature map $F_k$ for a y-th row and an x-th column, and $T_f$ denotes a feature binarize threshold.

As a result of binarizing the channel, the active region may be identically formed as shown in the second row of FIG. 10. Compared to the non-binarized predecessor, the bird's body and head may have the same values. Accordingly, the present disclosure may force the highlighted portions within the channel to contribute uniformly to the class activation map. That is, in the former case, the pixel values within the channel affect the final result, but now it may matter how often the activated region appears on the whole.

In FIG. 9, the method according to the present disclosure may capture a range of an object compared to a method that does not binarize the feature map. This may also be verified with quantitative results through an ablation study.

The method according to the present disclosure may maintain a balance between and within channels to solve the intrinsic problem of the existing methods. In other words, in the case of the present disclosure, an equal relationship between channels and activations may be guaranteed to prevent detection of only the singular part. The method according to the present disclosure may be effective because it fully utilizes the given information without any additional learning.

Hereinafter, the process of verifying whether the method according to the present disclosure is effective through the following experiment will be described.

Dataset: The effectiveness and scalability of the method according to the present disclosure may be evaluated in ImageNet, Caltech-UCSD Birds200-2011 (CUB), and OpenImages30k. The ImageNet is a very large dataset composed of 1.2 million training images for 1000 classes and 10K validation images. The CUB may be composed of 5994 training images and 5784 validation images for 200 classes. The CUB data set is a subdivided data set. Accordingly, it may be more difficult to capture the whole object as the classifier tends to focus on more singular parts to determine what the object is. In both cases, it is annotated as a bounding box. The OpenImages includes 29819 training images and 5000 validation images. This data set may be slightly different from other datasets as it is an instance segmentation dataset and is annotated by a per-pixel mask.

Implementation detail: VGG16, Inception V3, and ResNet50 are used as the backbone network. In the case of the VGG16, the top pooling layer and two fully connected layers are replaced with the global average pooling layer connected to the fully connected layer. The Inception V3 may be adjusted according to a predetermined method. Baseline methods are trained according to a predetermined training setting. Based on an extensive ablation study, it is possible to find the optimal hyperparameter value for each method.

Evaluation Metric: Several evaluation metrics such as ground-truth class detection accuracy (GT-known Loc), Top1 detection accuracy (Top1 Loc), maximum box accuracy (MaxboxAcc), and pixel average precision (PxAP) are used. The GT-known Loc may be given a ground truth class label in advance and may directly obtain the corresponding class activation map. Regardless of the classification result, when an intersection over union (IoU) of a ground truth bounding box and an estimated box is greater than t, it is determined to be correct. The Top1 Loc requires both classification and localization to predict accurately, but the GT-know Loc is sufficient when only the detection prediction is correct. In this experiment, t is fixed to 50% for the Top1 Loc. The PxAP corresponds to a region under a curve of a pixel precision recall curve at all thresholds. Although the PxAP is the most ideal metric, many data sets only provide box annotations. In order to replace the PxAP to some extent, MaxboxAcc obtains the results of GT-known Loc when t is 30%, 50%, and 70%, respectively, and uses the average.

Figure 11:
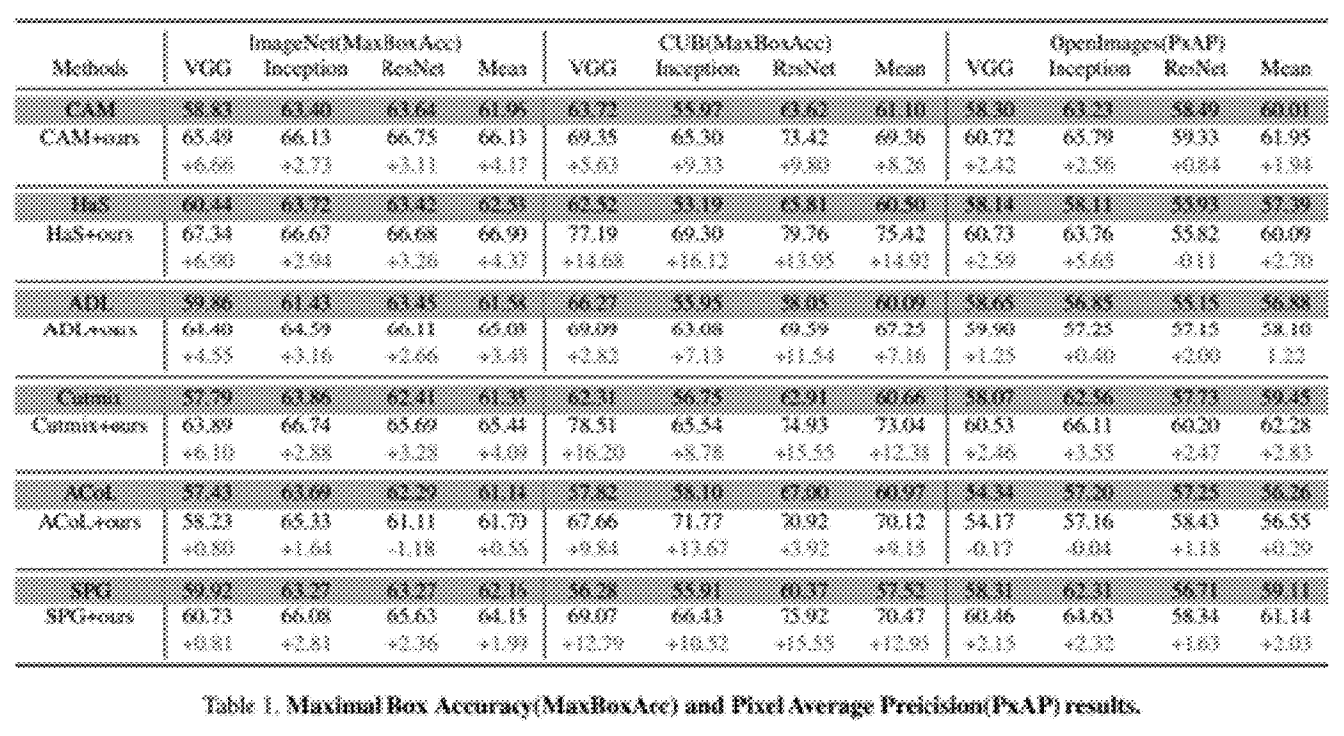

Here, the applicability may be verified by applying the method according to the present disclosure to multiple baseline models. FIG. 11 illustrates experimental results for the CUB, the ImageNet, and the OpenImages. The MaxboxAcc metric is used for the CUB and the ImageNet in FIG. 11 and the PxAP is used for the OpenImages. FIG. 12 illustrates the results of comparing the CAM and the method by the Top1 Loc and the GT Loc. As such, the method according to the present disclosure may further improve almost any baseline model. In particular, when the method according to the present disclosure is applied to the data augmentation-based method, the performance may be greatly improved.

In addition to these classic baseline models, the method according to the present disclosure may also be applied to other recently proposed methods. FIGS. 12 and 13 illustrate the results for this. The method according to the present disclosure may also be effective in the new method, and the result may indicate the scalability of the method according to the present disclosure.

Further ablation studies are performed to validate the effectiveness of the method according to the present disclosure.

Contributions of Each module for Localization Performance: An ablation study is performed on various combinations of the main components of the method according to the present disclosure. FIG. 15 illustrates the results of the ablation study. Experiments may be executed based on the ResNet50 with the CAM. By using the weight binarization module which has the same effect as the CAAM, the MaxBoxAcc score of the baseline may be increased from 63.62% to 72.92% of the CUB. However, the accuracy of the ImageNet may drop from 63.64% to 61.66%. Combining the channel selection and the weight binarization may overcome the disadvantages of the weight binarization in the ImageNet in that it achieves 65.09% while maintaining the performance in the CUB. Finally, the feature map binarization module may further improve the localization accuracy for all of the corresponding data sets. The feature map binarization module may achieve a 66.75% MaxBoxAcc score for the ImageNet, but obtain 73.43% for the CUB.

Hyperparameter searching for optimal θw: Finding the optimal hyperparameter may require additional cost. Using a test set gives better performance, but may lead to an unfair problem in comparisons. In addition, when the test set is used, a high cost may occur in consideration of the number of test set images. Therefore, the transferability of the hyperparameter θw between validation and test segmentation is investigated. As illustrated in FIG. 16, it is possible to set the set (0, 0.2, 0.4, 0.6 and 0.8) as candidates for θw and compare the performance of each value in the validation and test sets. The CAM for Inception v3 is a baseline model and the ImageNet, the CUB, and the OpenImages datasets may be used. In FIG. 16, it can be seen that the performance variances for the validation and test sets show very similar trend.

A CAM-based weakly supervised object localization method according to the present disclosure may relate to a novel method of generating a feature map for better object localization performance. As the present disclosure confirms that the classification weights are not optimal for object localization, the weights may be binarized and useful channels for the target task may be selected. In addition, the present disclosure may binarize activation in a channel so that the entire area of the target object has the same contribution. The method according to the present disclosure is simple yet generalizable to existing methods, and may achieve similar performance for the CUB, the ImageNet, and the OpenImages without additional training.

Although exemplary embodiments of the present disclosure have been disclosed hereinabove, it may be understood by those skilled in the art that the present disclosure may be variously modified and altered without departing from the scope and spirit of the present disclosure described in the following claims.

What is claimed is:

1. A CAM-based weakly supervised object localization (WOSL) device, comprising:
   a feature map extractor configured to extract a feature map of a last convolutional layer in a convolutional neural network (CNN) in a process of applying an image to the CNN;
   a weight vector binarization unit configured to first binarize a weight vector of a linear layer in a process of sequentially applying the feature map to a pooling layer that generates a feature vector and the linear layer that generates a class label;
   a feature map binarization unit configured to second binarize the feature map based on the first binarized weight vector; and
   a class activation map generation unit configured to generate a class activation map for object localization based on the second binarized feature map.

2. The CAM-based weakly supervised learning object localization device of claim 1, wherein the pooling layer is implemented to generate the feature vector by performing global average pooling on the feature map.

3. The CAM-based weakly supervised learning object localization device of claim 1, wherein the weight vector binarization unit performs the first binarization on the weight vector based on a threshold.

4. The CAM-based weakly supervised learning object localization device of claim 3, wherein the weight vector binarization unit performs a grid search based on a plurality of relative thresholds in order to optimize the threshold.

5. The CAM-based weakly supervised learning object localization device of claim 4, wherein the weight vector binarization unit performs the grid search using Equation 1 below:

$$\tau_{w_c} = \min(w_c) + \{\max(w_c) - \min(w_c)\} * \theta_w, \quad \text{[Equation 1]}$$

wherein, $\tau_{w_c}$ denotes an optimal threshold for a weight of a c-th target class, $c \in C$ (where C is the number of target classes), $w \in W$ (where W is the weight vector), and $\theta_w$ denotes the relative threshold.

6. The CAM-based weakly supervised learning object localization device of claim 1, wherein the feature map binarization unit applies the first binarized weight vector to the feature map to select at least one of the channels of the feature map.

7. The CAM-based weakly supervised learning object localization device of claim 1, wherein the feature map binarization unit performs the second binarization on the at least one of some channels based on a feature binarize threshold.

8. The CAM-based weakly supervised learning object localization device of claim 1, wherein the feature map binarization unit performs the second binarization using Equation 2 below:

$$F_k = 1(F_k(x,y) > T_f), \quad \text{[Equation 2]}$$

wherein, $F_k(x,y)$ denotes an element of a k-th channel of a feature map $F_k$ for a y-th row and an x-th column, and $T_f$ denotes a feature binarize threshold.

9. The CAM-based weakly supervised learning object localization device of claim 1, wherein the class activation map generation unit generates the class activation map by aggregating the at least one of second binarized some channels.

10. A CAM-based weakly supervised object localization (WOSL) method, comprising:
    extracting a feature map of a last convolutional layer in a convolutional neural network (CNN) in a process of applying an image to the CNN;
    first binarizing a weight vector of a linear layer in a process of sequentially applying the feature map to a pooling layer that generates a feature vector and the linear layer that generates a class label;
    second binarizing the feature map based on the first binarized weight vector; and
    generating a class activation map for object localization based on the second binarized feature map.

11. The CAM-based weakly supervised object localization method of claim 10, wherein the first binarizing includes performing the first binarization on the weight vector based on a threshold.

12. The CAM-based weakly supervised object localization method of claim 10, wherein the second binarizing includes selecting at least one of some channels among channels of the feature map by applying the first binarized weight vector to the feature map.

13. The CAM-based weakly supervised object localization method of claim 10, wherein the second binarizing includes performing the second binarization on the at least one of some channels based on a feature binarize threshold.

\* \* \* \* \*